Figure 1:
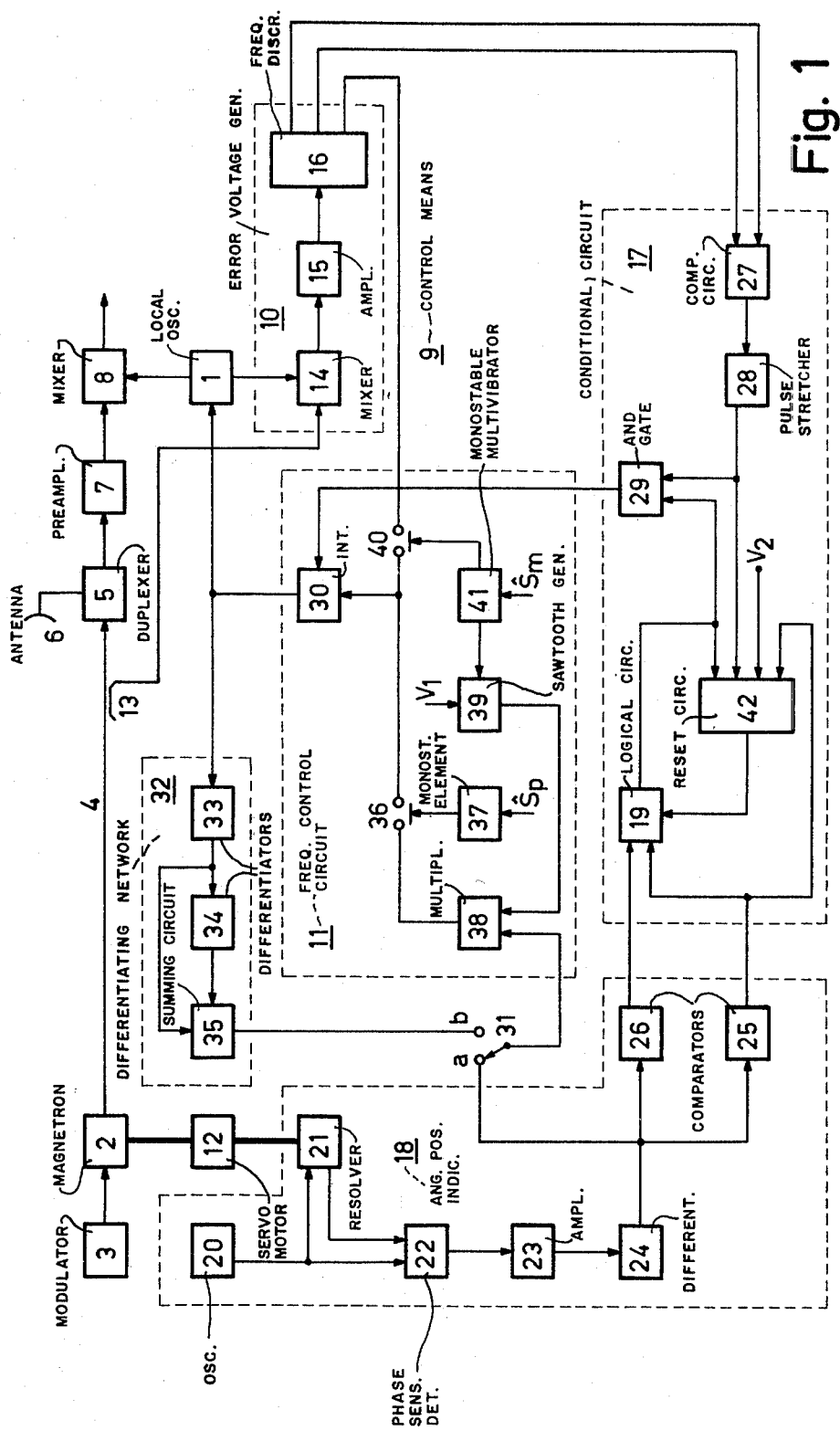

United States Patent [19]

Burgers et al.

[11] 3,979,678

[45] Sept. 7, 1976

[54] PULSE RADAR APPARATUS

[75] Inventors: Bernhardus Walter Antonius Burgers; Wilhelmus Antonius Teulings, both of Haaksbergen, Netherlands

[73] Assignee: Hollandse Signaalapparaten B.V., Hengelo, Netherlands

[22] Filed: Sept. 18, 1974

[21] Appl. No.: 507,365

[30] Foreign Application Priority Data
Sept. 21, 1973 Netherlands.................. 7313021

[52] U.S. Cl................................ 325/184; 325/17; 325/420
[51] Int. Cl.²........................................ H04B 1/04
[58] Field of Search............ 325/184, 17, 416, 418, 325/419, 420, 423; 343/17.1, 5 ST, 176, 178, 179

[56] References Cited
UNITED STATES PATENTS
2,913,718 11/1959 Chapin.......................... 343/17.1 R
3,121,221 2/1964 Sullivan et al. ............. 343/17.1 R X

*Primary Examiner*—Robert L. Griffin
*Assistant Examiner*—Robert Hearn
*Attorney, Agent, or Firm*—Frank R. Trifari; George B. Berka

[57] ABSTRACT

Pulse radar apparatus comprising at least an error voltage generator, a dither-tuned magnetron, a frequency control circuit, a conditional circuit and an angular position indicator connected to the magnetron tuning shaft for turning the local oscillator frequency $f_l$ to a frequency $f_{lo}$, showing a fixed difference $f_o$ with the magnetron frequency, where $f_o = f_z - f_{lo}$. When, by means of the indicator, the conditional circuit determines that the magnetron is being tuned in a defined frequency range comprising the frequency $f_l$, the frequency control circuit is alternatively supplied with an error voltage and a voltage proportional to $$\frac{df}{dt},$$

to deliver a fine and a coarse tuning voltage, respectively.

8 Claims, 3 Drawing Figures

PULSE RADAR APPARATUS

The invention relates to a pulse radar apparatus provided with a control circuit to fine tune a tunable local oscillator at a momentary frequency $f_l$ to a frequency $f_{lo}$, which shows a difference $f_o$, fixed in sign and magnitude, with the momentary transmitter frequency $f_z$, where $f_o = f_z - f_{lo}$. The control circuit thereto comprises a continuously tunable transmitting device and an error voltage generator, which derives an error voltage from the signals supplied by the transmitting device and the local oscillator. This error voltage is proportional to the frequency difference $|\Delta f| - |f_o|$, where $\Delta f$ equals the frequency difference between the momentary transmitter frequency $f_z$ and the momentary local oscillator frequency $f_l$.

Such a pulse radar apparatus is known from "The Coaxial Magnetron," a publication of EMI-Varian, England. This publication describes a control circuit of a pulse radar apparatus to fine tune a local oscillator, using a dither-tuned magnetron of the coaxial type as a tunable transmitting device; in such a magnetron, one shaft revolution of the servo motor required for the transmitting device corresponds with one up and down harmonic motion of a tuning plunger in the resonator cavity of the magnetron.

The control circuit set forth further comprises a coarse control sub-circuit and a fine control sub-circuit to fine tune the local oscillator to the desired frequency $f_{lo}$. The coarse control sub-circuit contains a resolver coupled to the shaft of the servo motor, a phase-sensitive detector connected to the resolver, and a hold circuit connected to this detector; the phase-sensitive detector supplies a voltage of which the amplitude is directly related to the angular position of the servo motor shaft, and thus with the momentary transmitter frequency $f_z$. The hold circuit is used to sample the output voltage of the phase-sensitive detector, yielding a coarse tuning voltage for the local oscillator.

The fine control sub-circuit comprises an error voltage generator and a fast correction device, which processes the supplied error voltage and which derives a control voltage to fine tune the local oscillator. Owing to drift of the elements in the coarse control sub-circuit, it may be that incorrect control voltages are generated, so that the tuning of the local oscillator will be too coarse; the then prevailing error in the tuning of the local oscillator may be of such a magnitude that the subsequent fine tuning of the local oscillator by the fast correction device can be considered to be a mere coarse tuning. This disadvantage of the control circuit has been eliminated by the insertion of an integrator behind the error voltage generator. This integrator, in combination with the coarse control sub-circuit, delivers an acceptable coarse control voltage even in case of drift phenomena. However, owing to the large time constant, the integrator is unable to speedily and efficiently handle abrupt voltage fluctuations which may appear due to external interferences. In case of such a voltage fluctuation, only the fast correction device is capable to deliver a matched fine control voltage to the local oscillator during each pulse repetition time, until the integrator has adjusted itself to the respective voltage fluctuation. Also in this case, instead of the desired fine tuning, a coarse tuning of the local oscillator is realised; besides, for such an application of the fast correction device additional demands have to be made upon its design, which is to be regarded as a disadvantage. It is an object of the present invention to provide a pulse radar apparatus containing a control circuit of the type set forth in the opening paragraph, eliminating the abovementioned disadvantages to a large extent. A first measure taken to this effect is based on the fact that problems as to thermal drift will hardly occur when utilising differentiated voltages of the quantities involved. The control circuit is therefore provided with a frequency control circuit to obtain the tuning voltages for the local oscillator, the frequency control circuit receiving a setting voltage corresponding with the momentary change of the transmitter frequency $$\left( \frac{df}{dt} \right),$$

in addition to the error voltage. The setting voltage results in a coarse tuning of the local oscillator and the error voltage in a fine tuning of this oscillator. This measure cannot simply be applied, since during one up and down motion of the plunger in the magnetron resonator cavity the plunger positions can invariably be arranged in pairs in order of magnitude of the momentary frequency change $$\left( \frac{df}{dt} \right).$$

Different correction voltages derived from the same value, are however required for the frequencies corresponding with the plunger positions combined in pairs. This cannot be achieved without special measures. In addition, each transmitter frequency $f_z$ is in general associated with two local oscillator frequencies $f_{lo}$, viz: $f_z + f_o$ and $f_z - f_o$, showing the required difference $|f_o|$ with $f_z$, so that the local oscillator can be fine tuned to each of these frequencies. Therefore, the tuning voltages required for the local oscillator at a random initial setting of the magnetron cannot be derived from the $$\frac{df}{dt}$$

value and the error voltage.

Hence, on activating the pulse radar apparatus it is recommendable to introduce first a (second) measure, by which the transmitting device is tuned to a frequency range containing only frequency $f_z$, either $f_l + f_o$ or $f_l - f_o$, as desired to fine tune the local oscillator. After that the momentary local oscillator frequency $f_l$ should be (slightly) tuned to the desired frequency $f_{lo}$ during each pulse repetition time; this occurs - according to the first measure - with the aid of the control voltages derived from the $$\frac{df}{dt}$$

values and the error values.

According to the invention, the second measure entails that the pulse radar apparatus is further provided with an angular position indicator, coupled to the shaft of the servo motor required for the transmitting device, and also with a conditional circuit. With the aid of the angular position indicator the conditional circuit delivers a switching signal during a period the transmitting device is operative in a defined frequency range comprising the momentary transmitter frequency ($f_l + f_o$). The switching signal enables the frequency control circuit to adjust itself to the then prevailing setting voltage during a first time duration $T_1$ at the end of each pulse repetition time and to the then prevailing error voltage during a second time duration $T_2$ at the beginning of each pulse repetition time, in order to deliver the required tuning voltages.

It is found that, according to the second measure, a suitable embodiment of a pulse radar apparatus is obtained when the conditional circuit delivers the above-mentioned switching signal only if the afore-mentioned period lies between the moment the motor shaft reaches the position at which the transmitter frequency assumes the extreme value $f_{ze}$, where $|f_{ze} - f_l - f_o| < |f_{ze} - f_l|$ and maximally the moment the shaft position corresponds with the next extreme transmitter frequency. In this way it is achieved that the transmitting device is tuned to the first suitable frequency $f_z$ which occurs after passing an extreme value in the frequency range of the transmitting device.

In the following diagram description of a pulse radar apparatus the second measure entails that the transmitting device is tuned only to the frequency $f_{lo} + f_o$ which is attained after passing the maximum frequency $f_{ze}$. In a second embodiment of a pulse radar apparatus according to the second measure of the invention, the pulse radar apparatus is provided with a second voltage generator, of which the amplitude of the output voltage is directly related to the momentary local oscillator frequency $f_l$, and also with a difference detector deriving a difference voltage from the output voltage of the second voltage generator and that of the angular position indicator, the latter output voltage being in sinusoidal relationship with the rotation angle of the motor shaft. To obtain the output voltage of the angular position indicator, this indicator is provided with a resolver and a phase-sensitive detector connected thereto. The conditional circuit is formed by a comparator, which receives the above difference voltage and delivers the afore-mentioned control signal as soon as the difference voltages are below a fixed threshold and, consequently, the transmitting device is operative in the above-mentioned frequency range comprising the frequency ($f_l + f_o$). The above threshold value then corresponds with a fixed difference between a certain value of the momentary local oscillator frequency $f_l$ and the desired local oscillator frequency $f_{lo}$.

Also in case of the first measure, a choice can be made from two embodiments of a pulse radar apparatus, irrespective of the way in which the second measure is applied. A first embodiment of a pulse radar apparatus according to the first measure is obtained if the afore-mentioned setting voltage is derived from an angular position indicator, provided this indicator is furnished with a resolver coupled to the motor shaft, a phase-sensitive detector connected to this resolver and a differentiator connected to the detector.

A second and more suitable embodiment of a pulse radar apparatus according to the first measure is realised if the pulse radar apparatus contains a differentiating network, with which the desired setting voltage corresponding with the momentary transmitter frequency change $$\left( \frac{df}{dt} \right)$$

is obtained from the tuning voltage of the frequency control circuit.

Figure 2:
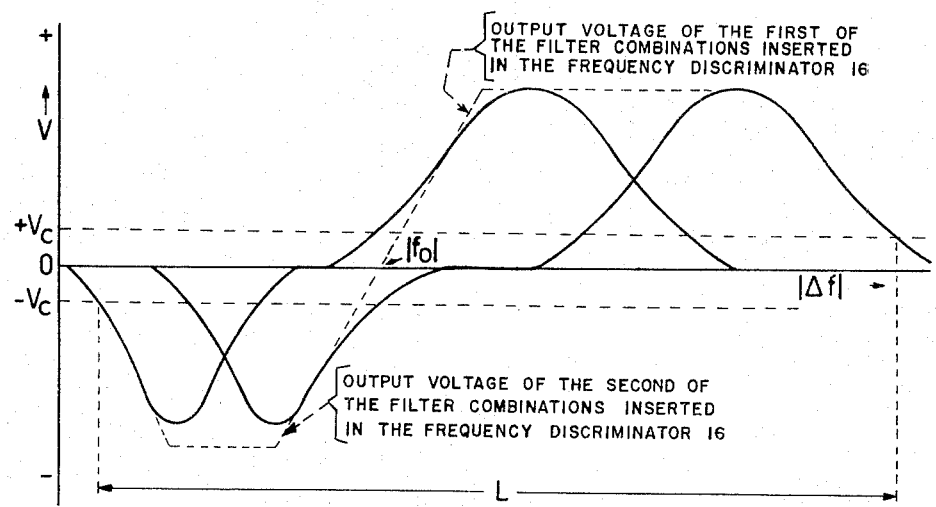
Figure 3:
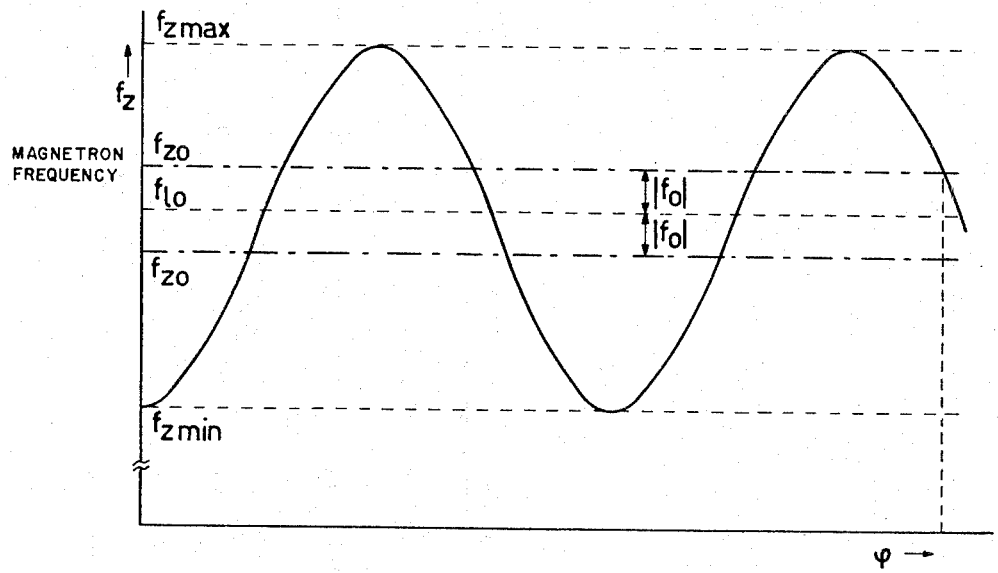

The invention and its advantages will now be described with reference to the accompanying figures, of which:

FIG. 1 illustrates an embodiment of a control circuit to fine tune the local oscillator in a pulse radar apparatus according to the invention, FIG. 2 illustrates the response characteristic of a frequency discriminator forming part of an error voltage generator of the pulse radar apparatus, FIG. 3 illustrates the relationship between the magnetron frequency $f_z$ and the angular position $\theta$ of the magnetron tuning shaft coupled to the servo motor.

FIG. 1 illustrates a control circuit in a pulse radar apparatus for the fine tuning of a local oscillator 1 to a frequency $f_{lo}$ which shows a difference $f_o$, fixed in sign and magnitude, with the momentary transmitter frequency $f_z$ of a continuously tunable magnetron 2, where $f_o = F_z - f_{lo}$. Local oscillator 1 is of the electrically tunable type, while magnetron 2 is of the type known as a dither-tuned magnetron in the radar technique. With the aid of a high-voltage modulator 3, magnetron 2 is periodically connected to a high voltage source for a very brief period of time, each time generating an RF pulse. The RF pulse is transmitted via a waveguide 4, a duplexer 5 and an antenna 6. The return signal is applied to a mixer 8 via duplexer 5 and, if present, an RF preamplifier 7. In mixer 8 the return signal is converted to an intermediate frequency signal. The mixer is hereto supplied with the output signal of local oscillator 1, of which the frequency, at least in the embodiment in question and insofar the fine tuning of local oscillator to frequency $f_{lo}$ is in process, is lower than frequency $f_z$ of the RF pulse and only deviates from $f_z$ such that a difference frequency in the intermediate range can be obtained from the mixing signal of mixer 8.

Since it is desired that, after the radar apparatus is switched on and local oscillator 1 is preset to a given frequency $f_l$, the momentary difference frequency $\Delta f$ between $f_l$ and $f_z$ ($\Delta f = f_z - f_l$) assumes the fixed value $f_o$ as soon as possible and retains this value during the operating period of the radar apparatus, local oscillator 1 is, according to the invention, fine tuned to the desired frequency $f_{lo} = f_z - f_o$ through a control circuit 9. Control circuit 9 hereto comprises, in addition to local oscillator 1, also an error voltage generator 10 and a frequency control circuit 11.

The function and the interrelation of these subcircuits are further described hereinafter.

A servo motor 12 is used to drive a plunger up and down in the resonator cavity of magnetron 2, the rotational motion of servo motor 12 being converted into a translational motion to move the plunger. During such a motion, magnetron 2 is continuously tuned; the relationship between the momentary transmitter frequency $f_z$ and the angular position $\theta$ of the servo motor shaft is shown in the characteristic of FIG. 3. With a uniform rotational motion of the servo motor shaft, this characteristic also illustrates the magnitude of $f_z$ as a function of time $t$.

Through a directional coupler 13 in waveguide 4, a sample of the energy generated in magnetron 2 is fed to a mixer 14 in error voltage generator 10. This mixer also receives the output signal of local oscillator 1.

The mixer-generated signal, from which a signal with the momentary difference frequency $\Delta f$ can be derived, is applied through an amplifier 15 to a frequency discriminator 16, delivering a continuous voltage that corresponds with the response characteristic of this discriminator (see FIG. 2). In the embodiment in question, frequency discriminator 16 is hereto provided with two filter combinations, of which the output voltages are detected separately and with opposite polarity. The filter combinations have to be so tuned that the output voltage to be delivered changes its polarity just at frequency $f_o$, as shown in the characteristic of FIG. 2. In frequency control circuit 11 a tuning voltage can be derived from a voltage corresponding to the voltage characteristic of FIG. 2, insofar at least the difference frequency $\Delta f$ is situated in the linear part near frequency $f_o$ (see FIG. 2). This tuning voltage is used to fine tune local oscillator 1 to the desired frequency $f_{lo}$. An embodiment of such a frequency discriminator 16 is described in detail in the U.S. Pat. application Ser. No. 479,469, filed June 14, 1974. In view of the fine control of local oscillator 1, the problem arises that there are in general two frequency values $f_l$, viz. $f_z + f_o$ and $f_z - f_o$, showing the required difference $f_o$ with the transmitter frequency $f_z$. In this case, local oscillator 1 can be tuned to each of the frequencies $f_{lo} = f_z + f_o$ and $f_{lo} = f_z - f_o$. Therefore, prior to the fine tuning of frequency $f_l$ to the desired frequency $f_{lo}$, it is necessary to coarse tune magnetron 2 to a frequency range containing the transmitter frequency $f_z = f_l + f_o$ chosen to fine tune local oscillator 1 in the embodiments here described. The fine tuning of local oscillator 1 to the frequency $f_{lo} = f_z - f_o$ corresponding therewith could then be started at the moment $f_z$ is larger than $f_l$ obtained at the presetting of local oscillator 1. In order to determine this moment, transmitter frequency $f_z$ should continuously be compared with local oscillator frequency $f_l$; this is rather a cumbersome process. Hence, in the embodiment of a pulse radar apparatus described with reference to FIG. 1, another method is applied in which local oscillator 1 is not tuned to frequency $f_{lo}$ until magnetron 2 reaches the maximum transmitter frequency $f_{zmax}$. The fine tuning of local oscillator 1 to $f_{lo}$ ($=f_z-f_o$) then occurs automatically. The pulse radar apparatus is thereto provided with a conditional circuit 17 supplied with one or several signals to derive the moment of the maximum frequency $f_{zmax}$ of magnetron 2. Since the plunger position corresponding with this moment is obtained through the motor shaft, the pulse radar apparatus is accordingly provided with an angular position indicator 18, coupled to the motor shaft to derive the latter signals, while conditional circuit 17 contains a logical circuit 19 connected to angular position indicator 18. In this way, logical circuit 19 is capable to generate a (first) control signal from the signals supplied to conditional circuit 17 as soon as the maximum transmitter frequency $f_{zmax}$ has been passed. Only in the presence of this (first) control signal, it is possible to fine tune local oscillator 1 to frequency $f_{lo}$. If, however, the transmitter frequency then attains its minimum value $f_{zmin}$ and the fine tuning process of the local oscillator has not yet started, the first control signal may no longer be generated. Generation of this control signal may be resumed only when magnetron 2 again passes the maximum transmitter frequency $f_{zmax}$. Three embodiments of angular position indicator 18 and logical circuit 19 matched thereto are described in detail with reference to FIGS. 1-3 in the afore-mentioned U.S. Pat. application Ser. No. 479,469.

One of these embodiments is shown in FIG. 1, in which angular position indicator 18 comprises an oscillator 20, a resolver 21 coupled to the servo motor shaft, a phase-sensitive detector 22, an amplifier 23, a differentiator 24 and two comparators 25 and 26. Resolver 21 connected to oscillator 20 produces a voltage which is detected in the phase-sensitive detector 22 with the aid of the output voltage of oscillator 20. The voltage thus obtained is applied via amplifier 23 to differentiator 24, of which the output voltage is delivered to comparators 25 and 26. Comparator 25 produces a positive output signal only when and so long as the output voltage of differentiator 24 is above a fixed positive value, thus indicating that magnetron 2 is tuned to a higher frequency. On the other hand, comparator 26 delivers a positive output voltage only when and so long as the output voltage of differentiator 24 is below a fixed negative value, thus indicating that magnetron 2 is being tuned to a lower frequency. The signals produced by the two comparators 25 and 26 are separately supplied to logical circuit 19.

It is preferred to start the fine tuning of local oscillator 1 not before transmitter freqeuncy $f_z$ is close enough to the frequency value of the preset local oscillator 1. At the same time the difference frequency $\Delta f$ is close enough to frequency value $f_o$, so that the fine tuning based on the error voltage can also be started. As soon as the latter condition has been fulfilled, a second control signal is to be generated in conditional circuit 17. The fine-tuning process may be started only in the presence of both the first and the second control signals. The second control signal is obtained with the aid of error voltage generator 10, which thereto generates, in addition to the output voltage of frequency discriminator 16 — indicated as error voltage— two other output signals, from which it can be determined whether the difference frequency $\Delta f$ is close enough to the frequency value $f_o$. Conditional circuit 17 is hereto also provided with a dual comparator circuit 27 and a pluse stretcher 28 connected thereto, the two output voltages of the two filter combinations of frequency discriminator 16 being separately supplied to comparator circuit 27.

In comparator circuit 27 the positively detected signal voltages are compared with a positive reference voltage $+V_c$ and the negatively detected signal voltages with a negative reference voltage $-V_c$. In case one of the signals exceeds the respective reference voltage (this is possible only within the frequency range indicated by L in the characteristic of FIG. 2), pulse stretcher 28 receives a standard pulse from comparator circuit 27. With each standard pulse received, pulse stretcher 28 is capable to deliver an output signal prevailing for several pulse repetition times.

In this way it is achieved that, when the difference frequency $\Delta f$ is within the frequency range L (see FIG. 2), pulse stretcher 28 generates a continuous output signal representing the second control signal.

When the first and the second control signals are present simultaneously, frequency control circuit 11 receives a switching signal from conditional circuit 17 via an AND gate 29 activated by the first and second control signals. This releases an integrator 30 incorporated in frequency control circuit 11 in order to produce a tuning voltage for local oscillator 1. This embodiment of a pulse radar apparatus thus satisfies the requirement that the fine tuning of local oscillator 1 is possible only, if the difference frequency $\Delta f$ lies in the frequency range indicated by L in FIG. 2, after reaching the maximum frequency $f_{zmax}$.

A second embodiment of a pulse radar apparatus according to the invention is provided with a (second) voltage generator, of which the amplitude of the output voltage is in direct relationship with the present local oscillator frequency $f_l$, and also with a difference circuit which derives a difference voltage from the output voltage of the second voltage generator and from the output voltage of angular position indicator 18.

According to the invention, conditional circuit 17 comprises a comparator, receiving the difference voltage and delivering the above-mentioned switching signal as soon as the difference voltage is below a fixed threshold value, such that the transmitting device is active in a frequency range comprising the sum frequency $f_l + f_o$.

The angular position indicator is preferably provided with a resolver, coupled to the servo motor shaft, and a phase-sensitive detector connected to this resolver. The phase-sensitive detector supplies a voltage of which the amplitude is in sinusoidal relationship with the rotation angle of the motor shaft and, hence, with the momentary frequency $f_z$ of the magnetron. The output voltage of the second voltage generator and that of the phase-sensitive detector are then compared with each other in the comparator, as described.

In the two embodiments the tuning process is to be started after the delivery of the switching signal; in the first instance, local oscillator 1 is so tuned that, at the moment the next transmitter pulse is generated, the difference value $\Delta f$ may be expected to be in the around part arund $f_o$ in the characteristic of FIG. 2. Secondly, the local oscillator may be fine tuned to the desired frequency $f_{lo}$ through the error voltage then available. Since the pulse repetition time is many times smaller than the revolution time of the servo motor shaft and therefore the same number of times smaller than the time in which magnetron 2 has traversed the allocated frequency band fully up and down, the momentary change of the transmitter frequency $$( \frac{df}{dt} )$$

may be regarded constant within one pulse repetition time. Local oscillator 1 can therefore be supplied with a coarse tuning voltage change $\Delta V_g$ in the form of $$\Delta V_g = C \cdot \tau \cdot \frac{df}{dt},$$

where $\tau$ is the then prevailing pulse repetition time. There are two methods to obtain a coarse tuning voltage which is proportional to $$\frac{df}{dt}.$$

In case of the first method, angular position indicator 18 comprises the afore-mentioned combination of resolver 21 coupled to the servo motor shaft, the phase-sensitive detector 22 connected thereto, oscillator 20 for resolver 21 and detector 22, amplifier 23 connected to detector 22, and differentiator 24 connected to this amplifier. Since phase-sensitive detector 22 generates a voltage proportional to the momentary magnetron frequency $f_z$, the output voltage of differentiator 24 is proportional to $$\frac{df}{dt}.$$

The latter voltage is applied to frequency control circuit 11 via a switch 31 being in position a. When applying a second method the voltage proportional to $$\frac{df}{dt}$$

is obtained from a differentiating network 32 via switch 31 being in position b. Differentiating network 32 is connected to the output of frequency control circuit 11. In the embodiment in question this network is provided with a first differentiator 33, a second differentiator 34 connected to differentiator 33, and a summing circuit 35 connected to both differentiators 33 and 34. On the presence of the switching signal, the output voltage of integrator 30 does not change its value, since integrator 30 has not yet been set to an error voltage. For a timely fine setting of local oscillator 1 the error voltage has to be delivered to integrator 30 as quickly as possible, the latter error voltage is already generated before integrator 30 receives the switching signal. Therefore, no coarse tuning can occur directly after the delivery of the switching signal. Consequently, no fine tuning can be performed. However, this deficiency can be eliminated by presetting local oscillator 1 in such a way that its frequency $f_l$ is near the extreme value $f_{ze}$. In such a situation the momentary change of the transmitter frequency $$( \frac{df}{dt} )$$

is small, eliminating the need for coarse tuning. As soon as integrator 30 has adjusted itself to the next error voltage, its output voltage changes, so that by correctly dimensioning the subcircuits in differentiating network 32 a correct voltage can be derived from this network for frequency control circuit 11 in order to coarse tune local oscillator 1.

When the pulse radar apparatus operates at a fixed pulse repetition time, the voltage supplied by either angular position indicator 18 or differentiating network 32 can be fed to the integrator 30 via a time switch 36, a monostable element 37 driven by pulse $\hat{S}_p$, closing this time switch each pulse repetition time for a short defined period of time $T_1$ starting a short fixed time before the next pulse. If, however, the pulse repetition time is not constant, the voltage of angular position indicator 18 or differentiating network 32 must be adapted to the pulse repetition time then prevailing. Thereto, frequency control circuit 11 is provided with a multiplier 38, inserted between switch 31 and time switch 36. In addition to the voltage of angular position indicator 18 or differentiating network 32, multiplier 38 is also supplied with a voltage proportional to the pulse repetition time then prevailing. The latter voltage is obtained from a sawtooth generator 39, incorporated in frequency control circuit 11. With each transmitter pulse ($\hat{S}_m$) generated, sawtooth generator 39 is reset. Since the moment at which switch 36 is closed for a short time $T_1$ immediately precedes the next transmitter pulse, the magnitude of the sawtooth voltage received at that moment by multiplier 38 may be regarded to represent the factor $\tau$ in the correction voltage $$\Delta V_o = C \cdot \tau \frac{df}{dt}.$$

Thus integrator 30, supplied with correction voltage $\Delta V_o$, provides an output voltage used to tune local oscillator 1 in the linear part of the error voltage characteristic near $f_o$ (see FIG. 2) as required for the next transmitter pulse. Using the error voltage then available, integrator 30 can commence to fine tune local oscillator 1; this occurs through a switch 40 controlled by monostable multivibrator 41 driven by pulse $\hat{S}_m$. This switch closes for a short period of time only at the moment a transmitter pulse is generated.

The following situations deserve special attention:
a. The output signal of local oscillator 1 or magnetron 2 drops out;
b. The quality of magnetron 2 is so poor that a considerable number of "missing links" are produced;
c. The supply voltage of the pulse radar apparatus is switched on;
d. Local oscillator 1 is not operative untl the supply voltage has been on for some time.
e. The local oscillator signal drops out for some time in a period when the second control signal is absent, whereas magnetron 2 is tuned continuously.

In all of these cases it is advisable to repeat the tuning procedure of local oscillator 1 to a frequency $f_{lo}$, the repeat procedure being realized by a reset circuit 42. Such a reset circuit has already been described in detail in the afore-mentioned U.S. Pat. application Ser. No. 479,469.

In the embodiment described above, frequency $f_z$ was selected greater than the local oscillator frequency $f_{lo}$. A suitable radar apparatus will, however, also be obtained if frequency $f_z$ is taken smaller than $f_{lo}$.

What we claim is:

1. Pulse radar apparatus comprising: a tunable local oscillator; a servomotor; a continuously tunable transmitting device controlled by said servomotor to generate and transmit r.f. pulse signals at a momentary frequecy $f_z$ in a sequence of defined interpulse periods; control means to fine tune said local oscillator operating at a momentary frequency $f_l$ to a frequency $f_{lo}$ which is mixed with the momentary transmitter frequency $f_z$ to produce a difference frequency $f_o$, fixed in sign and magnitude, said control means including an error voltage generating means coupled to said local oscillator and to said transmitting device to generate an error voltage proportional to the frequency difference $|\Delta f| - |f_o|$ where $\Delta f = (f_z - f_l)$, a frequency control circuit to control tuning of said local oscillator, and means for producing a setting voltage corresponding to the momentary change of the transmitter frequency $\frac{df_z}{dt}$; switching means operable to apply said setting voltage and said error voltage to said frequency control circuit; an angular position indicator coupled to the rotor of said servomotor; a conditional circuit which in response to the output from said position indicator delivers a switching signal to said switching means during a period when the transmitting device is operative in a frequency range $(f_l + f_o)$, to adjust said frequency control circuit during a first time interval $T_1$ at the end of each interpulse period to the setting voltage and, during a second time interval $T_2$ at the beginning of each interpulse period, to said error voltage.

2. Pulse radar apparatus as claimed in claim 1, wherein the frequency control circuit is provided with an integrator to deliver the tuning voltages for the local oscillator.

3. Pulse radar apparatus as claimed in claim 2, wherein the frequency control circuit comprises a sawtooth generator and a multiplier supplied with setting voltage and the output voltage of said sawtooth generator to produce an input voltage for the integrator.

4. Pulse radar apparatus as claimed in claim 1, wherein the conditional circuit delivers the control signal only if the period in which the transmitting device is operative in the defined frequency range, lies between the moment when the servomotor shaft reaches the position corresponding to the extreme value $f_{ze}$ of the transmitter frequency, where $|f_{ze} - f_l - f_o|$
< $|f_{ze} - f_l|$, and the moment said servo motor shaft reaches the position corresponding to the position at which the transmitting device generates the next extreme transmitter frequency.

5. Pulse radar apparatus as claimed in claim 1, wherein the angular position indicator includes a resolver and a phase-sensitive detector connected to said resolver, and further comprising a voltage generator, of which the amplitude of the output voltage is directly related to the momentary local oscillator frequency $f_l$, a difference circuit which derives a difference voltage from the output voltage of the second voltage generator and from the output voltage of said detector, and wherein the conditional circuit includes a comparator receiving said difference voltage and delivering the switching signal as soon as said difference voltage is below a fixed threshold value, so that the transmitting device is operative in the frequency range comprising the frequency $(f_l + f_o)$.

6. Pulse radar apparatus as claimed in claim 1, wherein the angular position indicator includes a resolver, a phase-sensitive detector connected to said resolver, and a differentiator connected to said phase-sensitive detector, whereby the setting voltage is derived from the output voltage of said differentiator.

7. Pulse radar apparatus as claimed in claim 1, wherein said means for producing a setting voltage includes a differentiating network, connected to the output of the frequency control circuit.

8. Pulse radar apparatus as claimed in claim 7, wherein the differentiating network comprises a first differentiator and a second differentiator connected to said first differentiator, said first differentiator being supplied with the tuning voltage, and the output voltage of said first differentiator and that of said second differentiator being combined to obtain the setting voltage.

* * * * *